(12) United States Patent
Garfinkel et al.

(10) Patent No.: US 9,296,310 B2
(45) Date of Patent: Mar. 29, 2016

(54) TRACTION BATTERY THERMAL MANAGEMENT SYSTEM

(71) Applicant: FORD GLOBAL TECHNOLOGIES, LLC, Dearborn, MI (US)

(72) Inventors: George Albert Garfinkel, Westland, MI (US); Patrick Daniel Maguire, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 27 days.

(21) Appl. No.: 14/217,730

(22) Filed: Mar. 18, 2014

(65) Prior Publication Data

US 2015/0266387 A1    Sep. 24, 2015

(51) Int. Cl.
    *H01M 10/6551* (2014.01)
    *B60L 11/18* (2006.01)
    *H01M 10/625* (2014.01)

(52) U.S. Cl.
    CPC ............ *B60L 11/187* (2013.01); *B60L 11/1879* (2013.01); *H01M 10/5016* (2013.01); *H01M 10/5046* (2013.01); *H01M 2220/20* (2013.01); *Y10S 903/907* (2013.01)

(58) Field of Classification Search
    CPC ............ H01M 10/50; H01M 10/6551; H01M 10/6557; H01M 10/60; H01M 10/6555; H01M 2/1077; H01M 10/6556; H01M 10/655; H01M 10/6552; H01M 10/6553; H01M 10/6554; F28F 3/083; F28F 3/08
    USPC ......................................... 420/120; 180/65.1
    See application file for complete search history.

(56) References Cited

U.S. PATENT DOCUMENTS

| | | | | |
|---|---|---|---|---|
| 4,724,190 A * | 2/1988 | Siga | ..................... | H01M 2/0242 429/158 |
| 5,472,802 A * | 12/1995 | Holland | .............. | H01M 2/1077 29/623.2 |
| 5,756,227 A | 5/1998 | Suzuki et al. | | |
| 6,479,185 B1 * | 11/2002 | Hilderbrand | ........ | H01M 2/1077 429/148 |
| 6,482,542 B1 * | 11/2002 | Takaki et al. | ................. | 429/120 |
| 7,572,549 B2 | 8/2009 | Wegner | | |
| 7,759,005 B2 * | 7/2010 | Hosaka | .................... | H01M 2/26 429/185 |
| 8,268,472 B2 * | 9/2012 | Ronning | ........... | H01M 10/5067 429/120 |
| 8,323,819 B2 * | 12/2012 | Lee et al. | ....................... | 429/120 |
| 8,409,743 B2 * | 4/2013 | Okada | ................. | H01M 2/1077 429/120 |
| 8,563,165 B2 * | 10/2013 | Takayama | ............. | B60L 3/0046 29/623.2 |
| 8,574,740 B2 * | 11/2013 | Quick | ................. | H01M 10/647 429/120 |
| 8,859,133 B2 * | 10/2014 | Oury | ................. | H01M 10/0525 429/120 |
| 8,920,958 B2 * | 12/2014 | Tatebayashi | .......... | B60L 11/123 429/127 |
| 8,932,742 B2 * | 1/2015 | Yoon | ................... | F28D 15/0275 165/185 |
| 8,986,872 B2 * | 3/2015 | Lev | .................. | H01M 10/6554 429/120 |
| 9,160,038 B2 * | 10/2015 | Buck | .................... | H01M 2/1077 |
| 2007/0018610 A1 * | 1/2007 | Wegner | ............... | H01M 2/0212 320/112 |
| 2010/0119929 A1 * | 5/2010 | Gaben | ................. | H01M 2/1077 429/120 |
| 2010/0330408 A1 * | 12/2010 | Yoon et al. | ..................... | 429/120 |
| 2011/0076540 A1 * | 3/2011 | Ronning et al. | ............. | 429/120 |
| 2011/0117410 A1 * | 5/2011 | Yoon | ............................ | 429/120 |

(Continued)

*Primary Examiner* — Brodie Follman
*Assistant Examiner* — Brian Cassidy
(74) *Attorney, Agent, or Firm* — David B. Kelley; Brooks Kushman P.C.

(57) ABSTRACT

A traction battery assembly includes a battery array having a plurality of stacked cells and a pair of thermal plates arranged to sandwich the array therebetween. Each thermal plate includes a plurality of fins. Each fin extends out from one of the thermal plates into the array and is interleaved with the cells to cool or heat the cells. Also, disclosed is a vehicle including the traction battery assembly described above.

17 Claims, 4 Drawing Sheets

(56) References Cited

U.S. PATENT DOCUMENTS

| | | | |
|---|---|---|---|
| 2011/0206964 A1* | 8/2011 | Odumodu et al. | 429/120 |
| 2011/0274956 A1* | 11/2011 | Lin | H01M 2/1077 429/99 |
| 2011/0274958 A1* | 11/2011 | Iritani et al. | 429/120 |
| 2012/0040223 A1* | 2/2012 | Odumodu | 429/120 |
| 2012/0082881 A1* | 4/2012 | Tsukamoto | H01M 10/425 429/120 |
| 2012/0270075 A1* | 10/2012 | Fujimura | H01M 2/02 429/7 |
| 2012/0282506 A1* | 11/2012 | Hohenthanner | H01M 2/021 429/99 |
| 2012/0298433 A1* | 11/2012 | Ohkura | 180/65.1 |
| 2012/0301769 A1* | 11/2012 | Okada | H01M 2/1077 429/120 |
| 2013/0101881 A1* | 4/2013 | Syed | H01M 2/1077 429/120 |
| 2013/0115506 A1 | 5/2013 | Wayne et al. | |
| 2013/0149576 A1* | 6/2013 | Lee et al. | 429/83 |
| 2013/0149582 A1* | 6/2013 | Kimura et al. | 429/120 |
| 2013/0196196 A1* | 8/2013 | Obeidi | H01M 10/443 429/82 |
| 2013/0216887 A1* | 8/2013 | Wayne et al. | 429/120 |
| 2013/0216888 A1* | 8/2013 | Shimura et al. | 429/120 |
| 2014/0030560 A1* | 1/2014 | Lev | H01M 10/625 429/72 |
| 2014/0154548 A1* | 6/2014 | Dillmann | H01M 10/5004 429/120 |
| 2014/0353057 A1* | 12/2014 | Adachi | H01G 11/10 180/68.5 |
| 2015/0093613 A1* | 4/2015 | Obasih | H01M 10/5016 429/82 |
| 2015/0125723 A1* | 5/2015 | You | B60L 11/1864 429/82 |
| 2015/0266387 A1* | 9/2015 | Garfinkel | B60L 11/187 180/65.1 |

\* cited by examiner

TRACTION BATTERY THERMAL MANAGEMENT SYSTEM

TECHNICAL FIELD

This disclosure relates to thermo systems for the thermal management of battery cells in electric vehicles.

BACKGROUND

Vehicles such as battery-electric vehicles (BEVs), plug-in hybrid electric vehicles (PHEVs) or full hybrid-electric vehicles (FHEVs) contain a battery, such as a high voltage battery, to act as an energy source for the vehicle. Battery capacity and cycle life can change depending on the operating temperature of the battery. It is generally desirable to maintain the battery within a specified temperature range while the vehicle is operating or while the vehicle is charging.

Vehicles with batteries may include thermal management systems to provide temperature control for the batteries to extend life and improve performance.

SUMMARY

In one embodiment, a traction battery assembly includes a battery array having a plurality of stacked cells. A pair of thermal plates are arranged to sandwich the array therebetween and include a plurality of fins extending out from only one of the thermal plates into the array. The plurality of fins is interleaved with the cells to cool or heat the cells.

In another embodiment, a traction battery assembly includes a battery array having a plurality of stacked cells. Each cell has a pair of opposing major surfaces. A thermal plate is disposed adjacent to a minor surface of each of the cells and includes a plurality of fins extending therefrom and terminating at a free end. Each of the fins is disposed between the major surfaces of two adjacent cells.

In yet another embodiment, the vehicle includes a body, an electric machine disposed within the body and wheels attached to the body. The wheels are powered by the electric machine. A traction battery assembly is configured to supply energy to the electric machine. The traction battery assembly includes a battery array having a plurality of stacked cells. A pair of thermal plates are arranged to sandwich the array therebetween. The pair of thermal plates each include a plurality of fins extending out from only one of the thermal plates into the array. The fins are interleaved with the cells.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
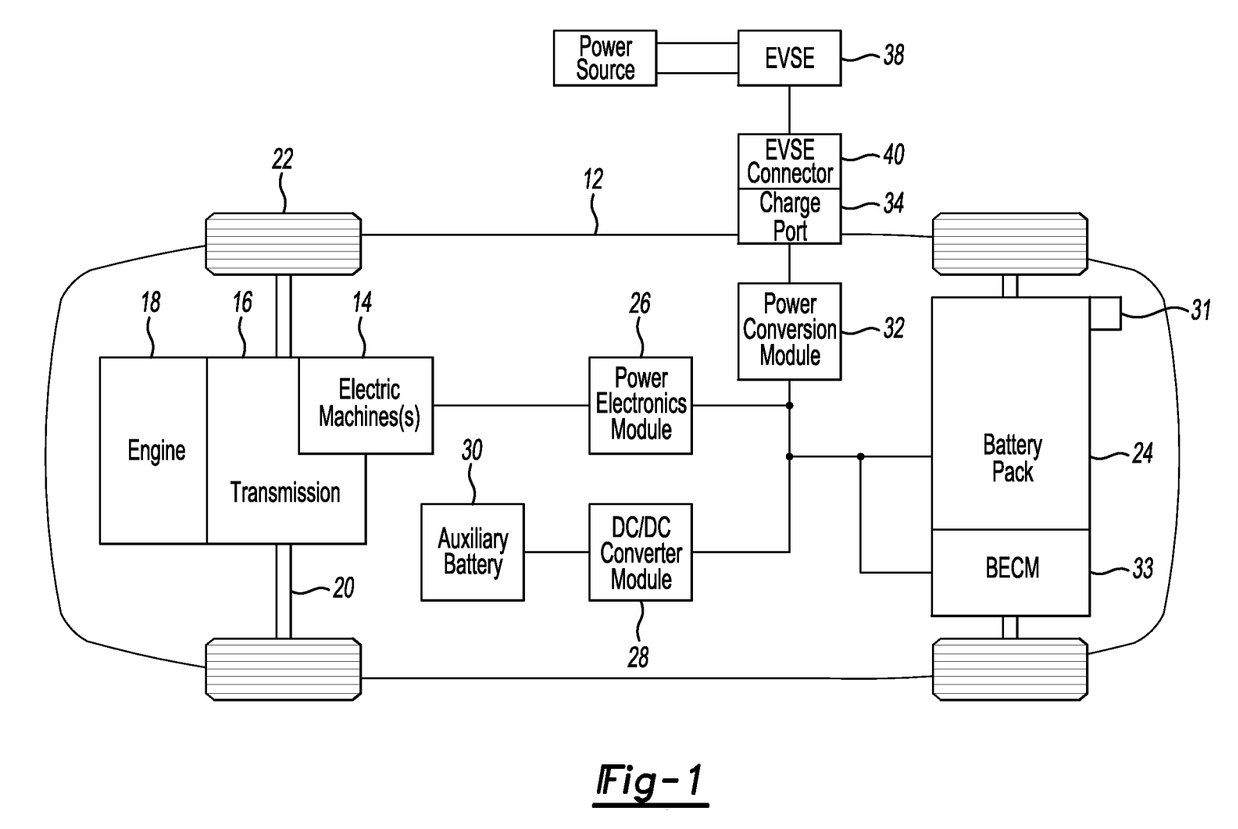
FIG. 1 depicts a schematic of a typical plug-in hybrid-electric vehicle.

FIG. 1 depicts a schematic of a typical plug-in hybrid-electric vehicle (PHEV). The vehicle 12 includes one or more electric machines 14 mechanically connected to a hybrid transmission 16. The electric machines 14 may be capable of operating as a motor or a generator. In addition, the hybrid transmission 16 is mechanically connected to an engine 18. The hybrid transmission 16 is also mechanically connected to a drive shaft 20 that is mechanically connected to the wheels 22. The electric machines 14 can provide propulsion and deceleration capability when the engine 18 is turned on or off. The electric machines 14 also act as generators and can provide fuel economy benefits by recovering energy through regenerative braking. The electric machines 14 reduce pollutant emissions and increase fuel economy by reducing the work load of the engine 18.

A traction battery or battery pack 24 stores energy that can be used by the electric machines 14. The traction battery 24 typically provides a high voltage direct current (DC) output from one or more battery cell arrays, sometimes referred to as battery cell stacks, within the traction battery 24. The battery cell arrays may include one or more battery cells. The traction battery 24 is electrically connected to one or more power electronics modules 26 through one or more contactors (not shown). The one or more contactors isolate the traction battery 24 from other components when opened and connect the traction battery 24 to other components when closed. The power electronics module 26 is also electrically connected to the electric machines 14 and provides the ability to bi-directionally transfer electrical energy between the traction battery 24 and the electric machines 14. For example, a typical traction battery 24 may provide a DC voltage while the electric machines 14 may require a three-phase alternating current (AC) voltage to function. The power electronics module 26 may convert the DC voltage to a three-phase AC voltage as required by the electric machines 14. In a regenerative mode, the power electronics module 26 may convert the three-phase AC voltage from the electric machines 14 acting as generators to the DC voltage required by the traction battery 24. The description herein is equally applicable to a pure electric vehicle. In a pure electric vehicle, the hybrid transmission 16 may be a gear box connected to an electric machine 14 and the engine 18 is not present.

In addition to providing energy for propulsion, the traction battery 24 may provide energy for other vehicle electrical systems. A typical system may include a DC/DC converter module 28 that converts the high voltage DC output of the traction battery 24 to a low voltage DC supply that is compatible with other vehicle loads. Other high-voltage loads, such as compressors and electric heaters, may be connected directly to the high-voltage without the use of a DC/DC converter module 28. In a typical vehicle, the low-voltage systems are electrically connected to an auxiliary battery 30 (e.g., 12V battery).

A battery electrical control module (BECM) 33 may be in communication with the traction battery 24. The BECM 33 may act as a controller for the traction battery 24 and may also include an electronic monitoring system that manages temperature and charge state of each of the battery cells. The traction battery 24 may have a temperature sensor 31 such as a thermistor or other temperature gauge. The temperature sensor 31 may be in communication with the BECM 33 to provide temperature data regarding the traction battery 24.

The vehicle 12 may be recharged by an external power source 36. The external power source 36 is a connection to an electrical outlet. The external power source 36 may be electrically connected to electric vehicle supply equipment (EVSE) 38. The EVSE 38 may provide circuitry and controls to regulate and manage the transfer of electrical energy between the power source 36 and the vehicle 12. The external power source 36 may provide DC or AC electric power to the EVSE 38. The EVSE 38 may have a charge connector 40 for plugging into a charge port 34 of the vehicle 12. The charge port 34 may be any type of port configured to transfer power from the EVSE 38 to the vehicle 12. The charge port 34 may be electrically connected to a charger or on-board power conversion module 32. The power conversion module 32 may condition the power supplied from the EVSE 38 to provide the proper voltage and current levels to the traction battery 24. The power conversion module 32 may interface with the EVSE 38 to coordinate the delivery of power to the vehicle 12. The EVSE connector 40 may have pins that mate with corresponding recesses of the charge port 34.

The various components discussed may have one or more associated controllers to control and monitor the operation of the components. The controllers may communicate via a serial bus (e.g., Controller Area Network (CAN)) or via discrete conductors.

The battery cells, such as a prismatic or pouch cell, may include electrochemical cells that convert stored chemical energy to electrical energy. The cells may include a housing, a positive electrode (cathode) and a negative electrode (anode). An electrolyte may allow ions to move between the anode and cathode during discharge, and then return during recharge. Terminals may allow current to flow out of the cell for use by the vehicle. When positioned in an array with multiple battery cells, the terminals of each battery cell may be aligned with opposing terminals (positive and negative) adjacent to one another and a busbar may assist in facilitating a series connection between the multiple battery cells. The battery cells may also be arranged in parallel such that similar terminals (positive and positive or negative and negative) are adjacent to one another. For example, two battery cells may be arranged with positive terminals adjacent to one another, and the next two cells may be arranged with negative terminals adjacent to one another. In this example, the busbar may contact terminals of all four cells.

Figure 2:
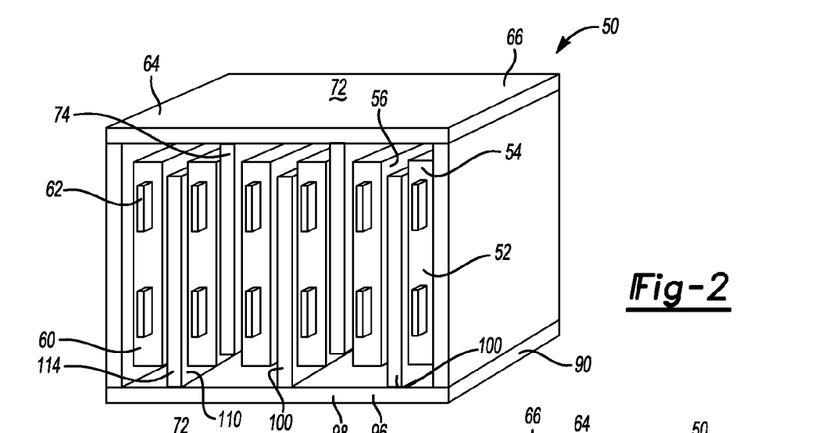
FIG. 2 illustrates a perspective view of a traction battery assembly.
Figure 3:
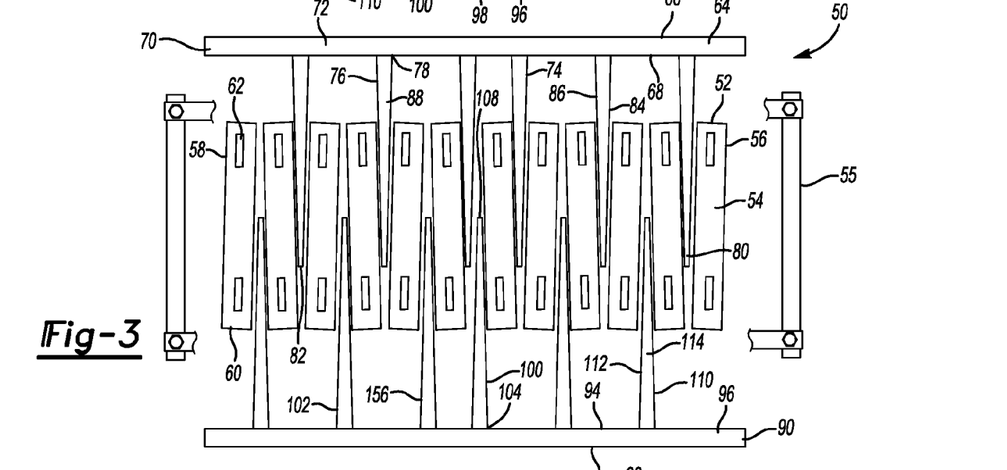
FIG. 3 illustrates an exploded front view of a traction battery assembly.
Figure 4:
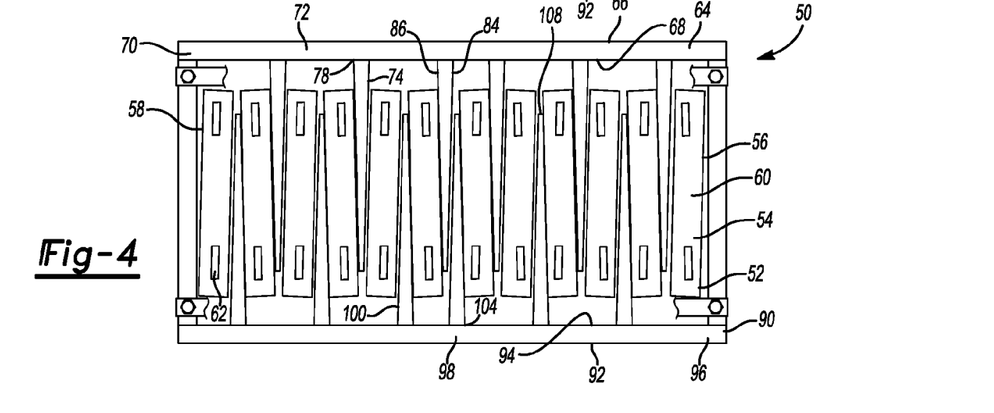
FIG. 4 illustrates a front view of the traction battery assembly shown in FIG. 3.

Referring to FIGS. 2, 3 and 4, diagrammatical views are shown of a conceptual traction battery assembly 50. The traction battery assembly 50 includes a battery array 52. The battery array 52 includes a plurality of stacked battery cells 54. Bracketry 55 may be used to secure the cells 54. Each battery cell 54 has a pair of opposing major surfaces 56, 58 that are interconnected by minor surfaces 60. The major surfaces 56, 58 may be substantially larger than the minor surfaces 60. However, different battery cell shapes are contemplated for use with the traction battery assembly 50. For example, the cells may be a pouch-type cell or may be a prismatic cell. Each battery cell 54 includes at least one terminal 62 extending outwardly from one or more of the minor surfaces 60. The terminals, if more than one, 62 may be on opposing minor surfaces 60 or may be on the same minor surface 60. The terminals 62 are interconnected by busbars (not shown) for electrically connecting the battery cells 54 in series or parallel.

The traction battery assembly 50 also includes a first thermal plate 64. The first thermal plate 64 has an exterior side 66 and an interior side 68. The exterior side 66 and interior side 68 are interconnected by sidewalls 70 forming a housing 72.

Inside the housing 72 are internal conduits for circulating a fluid medium through the thermal plate to transfer heat to or from the cells 54. The fluid medium may heat or cool the cells 54. The conduits are connected with a fluid medium circulation system (not shown). The circulation system enables heat exchange between the cells and plate, and recirculation of the coolant medium. The fluid medium may be any thermal conductive fluid, such as an ethylene glycol mixture or refrigerant.

The first thermal plate 64 includes a plurality of first fins 74. Each fin 74 has a base portion 76 and a tip portion 80. Each fin 74 is connected to the interior side 68 at the proximal end or fixed end 78 of the base portion 76. The fin may be connected by a variety of methods including, brazing, clamping or tongue and groove. Each fin 74 is arranged such that the tip portion 80 projects outwardly from the interior side 68 into the array 52. Each fin 74 includes a first contact surface 84 and a second contact surface 86 that is opposite the first contact surface 84. The contact surfaces 84, 86 are the surfaces that contact the cells 54. The contact surfaces 84, 86 may be substantially larger than the minor surfaces or side surfaces 88 that do not contact the cells 54. Each fin 74 is interleaved between adjacent cells 54 with the contact surfaces 84, 86 being in contact with the major surfaces 56, 58 of the cells 54.

Each fin 74 may be sized such that the fin 74 only extends across a portion of the major surfaces 56, 58 of the cells 54. Thus, the distal end or free end 82 of the tip portion 80 may be disposed within the perimeter of the major surfaces 56, 58. Alternatively, the fins 74 may extend across the length of the major surfaces 56, 58.

Figure 5:
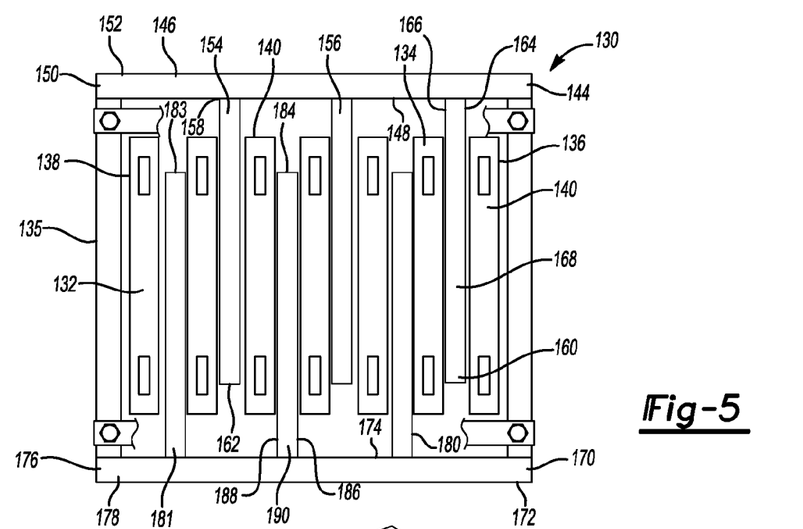
FIG. 5 illustrates a front view of another traction battery assembly.

The fins 74 may be a solid fin. The fins 74 may be formed of any thermally conductive material. A material having a thermal conductivity of at least 100 Watts/meter* degrees Celsius (W/m*C) may be advantageous. Exemplary materials include aluminum, copper, thermally conductive plastic or magnesium. The fins 74 may be tapered as shown in FIGS. 3 and 4 or may be uniform as shown in FIG. 5. Having tapered fins may provide better packaging by providing a more compact array. The tapered fins also help account for variations in cell and fin size providing a better fit and reduced stack up issues. The taper fins have enhanced thermal conduction because they are thicker at the base than at the tip and the base is where the most thermal conduction occurs. The fins 74 are tapered having wedge shaped minor surfaces 88. The contact surfaces 84, 86 are uniform and flat, having a substantially rectangular surface. The minor surfaces 88 are thickest at the proximal end 78 of the base portion 76 and taper to be thinnest at the distal end 82 of the tip portion 80. For example, the minor surface 88 may have a width of 1.0 millimeter (mm) at the proximal end 78 and have a width of 0.4 mm at the distal end 82. The tapering is substantially linear to provide relatively flat contact surfaces 84, 86. The cells 54 are arranged to be rotated about an axis projecting from the minor surface so that the cell major surfaces 56, 58 seat against the contact surfaces 84, 86.

The traction battery assembly 50 also includes a second thermal plate 90. The second thermal plate 90 has an exterior side 92 and an interior side 94. The exterior side 92 and interior side 94 are interconnected by sidewalls 96 forming a housing 98. The first and second thermal plates 64, 90 are disposed on opposing sides of the array 52 and are arranged to sandwich the array therebetween. Inside the housing 98 are internal conduits for circulating a fluid medium through the thermal plate to transfer heat to or from the cells 54. The fluid medium may heat or cool the cells 54. The conduits are connected with a fluid medium circulation system (not shown). The circulation system enables heat exchange between the cells and plate, and recirculation of the coolant medium. The fluid medium may be any thermal conductive fluid, such as an ethylene glycol mixture or refrigerant.

The second thermal plate 90 includes a plurality of second fins 100. Each fin 100 has a base portion 156 and a tip portion 160. Each fin 100 is connected to the interior side 94 at the proximal end or fixed end 104. The fins 100 may be connected to the thermal plate 90 by a variety of methods as described above. Each fin 100 is arranged such that the distal end or free end 108 projects outwardly from the interior side 94 into the array 52. Each fin 100 includes a first contact surface 110 and a second contact surface 112 that is opposite the first contact surface 110. The contact surfaces 110, 112 are the surfaces that contact the cells 54. The contact surfaces 110, 112 may be substantially larger than the minor or side surfaces 114. Each fin 100 is interleaved between adjacent cells 54 with the contact surfaces 110, 112 being in contact with the major surfaces 56, 58 of the cells 54. The first fins 74 are disposed between different pairs of adjacent cells than the second fins 100.

The first and second fins 74, 100 are arranged to alternate along the length of the array. FIGS. 2, 3 and 4 illustrate the arrangement as second fin 100, then cell 54 and then first fin 74. This sequence repeats along the length of the array 52. However, this disclosure contemplates different cell and fin sequences, such as a first fin, cell, cell, second fin.

Each fin 100 is sized such that the fin 100 only extends across a portion of the major surfaces 56, 58 of the cells 54. Thus, the distal end 108 is disposed within the perimeter of the major surfaces 56, 58. The first fins 74 and the second fins 100 are only in contact with their corresponding thermal plate. Alternatively, the fins 100 may extend across the length of the major surfaces 56, 58.

The fins 100 may be a solid fin. The fins 100 may be formed of any thermally conductive material such as aluminum, copper, thermally conductive plastic or magnesium. The fins 100 may also be tapered. The fins 100 are tapered having wedge shaped minor surfaces 114. The contact surfaces 110, 112 are uniform and flat, having a substantially rectangular surface. The minor surfaces 114 are thickest at the proximal end 104 of the base portion 102 and taper to be thinnest at the distal end 108 of the tip portion 106. For example, the minor surface 114 may have a width of 1.0 millimeter (mm) at the proximal end 104 and have a width of 0.4 mm at the distal end 108. The tapering is substantially linear to provide flat contact surfaces 110, 112. The cells 54 are arranged to be rotated about an axis projecting from the minor surface 114 so that the cell major surfaces 56, 58 seat against the contact surfaces 110, 112.

Optionally, sheets of thermal interface material (not shown) may be applied between the cells and the thermal fins. The sheets of thermal interface material may enhance the heat transfer between the cells and the fins by filling for example voids and/or air gaps between them. The thermal interface material may also provide electrical insulation between the cells and the battery assembly.

Referring to FIG. 5, a diagrammatical view is shown of another conceptual traction battery assembly 130. The assembly 130 is similar to assembly 50 but has fins with uniform thickness. The traction battery assembly 130 includes a battery array 132. The battery array 132 includes a plurality of stacked battery cells 134. Bracketry 135 may be provided to secure the cells 134. Each battery cell 134 has a pair of opposing major surfaces 136, 138 that are interconnected by minor surfaces 140. The major surfaces 136, 138 may be substantially larger than the minor surfaces 140. However, different battery cell shapes are contemplated for use with the traction battery assembly 132.

The traction battery assembly 130 includes a first thermal plate 144. The first thermal plate 144 has an exterior side 146 and an interior side 148. The exterior side 146 and interior side 148 are interconnected by sidewalls 150 forming a housing 152. Inside the housing 152 are internal conduits for circulating a fluid medium through the thermal plate 144 to transfer heat to or from the cells 134. The fluid medium may heat or cool the cells 134. The conduits are connected with a fluid medium circulation system (not shown). The circulation system enables heat exchange and recirculation of the coolant medium. The fluid medium may be any thermal conductive fluid, such as an ethylene glycol mixture or refrigerant. The thermal plate 144 may be disposed against the one of the minor surfaces 140 of the cells. This arrangement provides additional heat transfer because heat is transferred through both the major and minor surfaces.

The first thermal plate 144 includes a plurality of first fins 154. Each fin 154 has a uniform cross-sectional area unlike the tapered fin shown in FIGS. 2 to 4. Each fin 154 has a base portion 156 and a tip portion 160. Each fin 154 is connected to the interior side 148 at the proximal end 158 of the base portion 156. Each fin 154 is arranged such that the distal end 162 projects outwardly from the interior side 148 into the array 132. Each fin 154 includes a first contact surface 164 and a second contact surface 166 that is opposite the first contact surface 164. The contact surfaces 164, 166 are the surfaces that contact the cells 134. The contact surfaces 164, 166 may be substantially larger than the minor surfaces 168 that do not contact the cells 134. Each fin 154 is interleaved between adjacent cells 134 with the contact surfaces 164, 166 being in contact with the major surfaces 136, 138 of the cells 134.

The traction battery assembly 130 also includes a second thermal plate 170. The second thermal plate 170 has an exterior side 172 and an interior side 174. The exterior side 172 and interior side 174 are interconnected by sidewalls 176 forming a housing 178. The first and second thermal plates 144, 170 are disposed on opposing sides of the array 132 and are arranged to sandwich the array 132 therebetween. The second thermal plate 170 may be disposed against the one of the minor surfaces 140 of the cells as described above.

The second thermal plate 170 includes a plurality of second fins 180. Each fin 180 has a uniform cross-section area. Each fin 180 has a base portion 181 and a tip portion 183. Each fin 180 is connected to the interior side 174 at the base portion 181, which can also be called the proximal end. Each fin 180 is arranged such that the distal end 184 projects outwardly from the interior side 174 into the array 132. Each fin 180 includes a first contact surface 186 and a second contact surface 188 that is opposite the first contact surface 186. The contact surfaces 186, 188 are the surfaces that contact the cells 134. The contact surfaces 186, 188 may be substantially larger than the minor surfaces 190. Each fin 180 is interleaved between adjacent cells 134 with the contact surfaces 186, 188 being in contact with the major surfaces 136, 138 of the cells 134. The fins 180 are disposed between different pairs of adjacent cells than the first fins 154. The first and second fins 154, 180 are arranged to alternate along the length of the array 132 as previously described.

Figure 6:
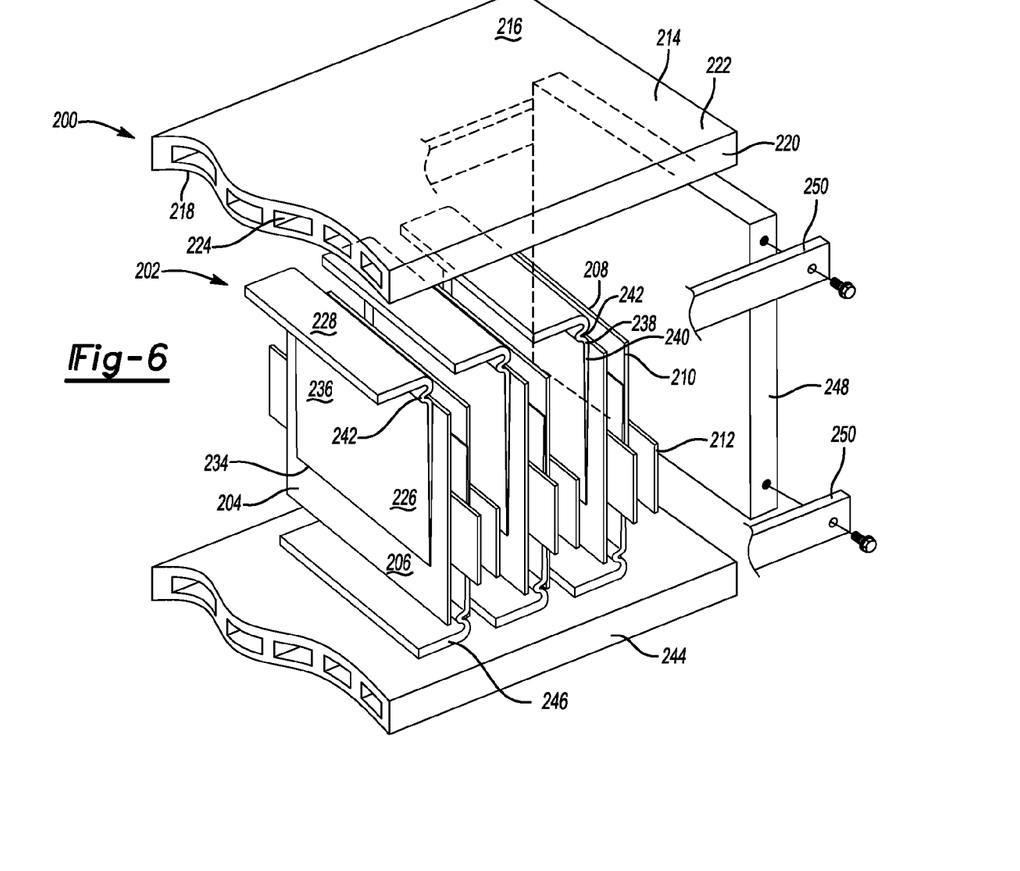
FIG. 6 illustrates a perspective view of a traction battery assembly having flexible fins.

Referring to FIG. 6, a traction battery assembly 200 is shown. The traction battery assembly 200 is similar to assemblies 50 and 130, but specifically illustrates a fin having a flexible portion. The assembly 200 includes a battery array 202. The battery array 202 includes a plurality of stacked cells 204. The invention contemplates the use of any type of cells. Illustrated are pouch-type cells 204 having a pair of opposing major surfaces 206, 208 that are interconnected by minor surfaces 210. Each cell 204 includes terminals 212 extending outwardly from one or more of the minor surfaces 210.

The traction battery assembly 200 includes a first thermal plate 214. The first thermal plate 214 has an exterior side 216 and an interior side 218. The exterior side 216 and the interior side 218 are interconnected by sidewalls 220 forming a housing 222. Inside the housing 222 are internal conduits 224 for circulating a fluid medium through the thermal plate 214 to transfer heat to or from the cells 204. The thermal plate 214 may be used to cool or heat the cells. The cells may be heated by circulating a warm fluid medium through the thermal plate 214. Heat may be provided to the fluid medium by an internal combustion engine or other heat source. The internal conduits 224 are connected with a fluid circulation system (not shown). The circulation system enables heat exchange and recirculation of the fluid medium. The fluid medium may be any thermal conductive fluid, such as an ethylene glycol mixture or refrigerant.

The first thermal plate 214 includes a plurality of first fins 226. Each fin 226 has a base plate 228 defining the proximal end of the fin 226. The base plate 228 is attached to the interior side 218 of the thermal plate 214. This disclosure contemplates all types of conventional connections, such as brazing, clamping, adhesive and/or fasteners. Each fin 226 is arranged such that the distal end 234 extends outwardly from the interior side 218 into the array 202. Each fin 226 includes a first contact surface 236 and a second contact surface 238 that is opposite the first contact surface 236. The contact surfaces 236, 238 are the surfaces that contact the cells 204. The contact surfaces 236, 238 may be substantially larger than the minor or side surfaces 240 that do not contact the cells 204. Each fin 226 is interleaved between adjacent cells 204 with the contact surfaces 236, 238 being in contact with the major surfaces 206, 208 of the cells 204. The fins 226 may be tapered or uniform as described above.

Each fin 226 includes a flexible portion 242. The flexible portion 242 allows each fin 226 to move relative to the thermal plate 214. The flexible portion includes a double hinge having first and second living hinges. The first and second living hinges are configured to move in opposite directions when a force is applied. This allows the fin 226 to translocate relative to the thermal plate 214 to equalize the forces exerted onto the fin 226 by the two adjacent cells 204. This provides flexibility to the array 202 and helps the first and second contact surfaces 236, 238 seat against the major surfaces 206, 208 of the cells 204. Having a flexible portion may also reduce stack up issues by allowing flexibility between the components within the array.

The battery assembly 200 also includes a second thermal plate 244. The first and second thermal plates 214, 244 are disposed on opposing sides of the array 202 and sandwich the array therebetween. The second thermal plate 244 is identical to the first thermal plate 214 and similarly includes a plurality of second fins 246 attached to the second thermal plate 244. The second fins 246 are identical to the first fins 226.

The assembly 200 may also include a pair of end plates 248 disposed on opposing sides of the array 202. Tensioning straps 250 interconnect the end plates 248 and provide compression to the array 202. The compression helps hold the fins 226, 246 against the cells 204 and helps hold the cells 204 in place.

Figure 7:
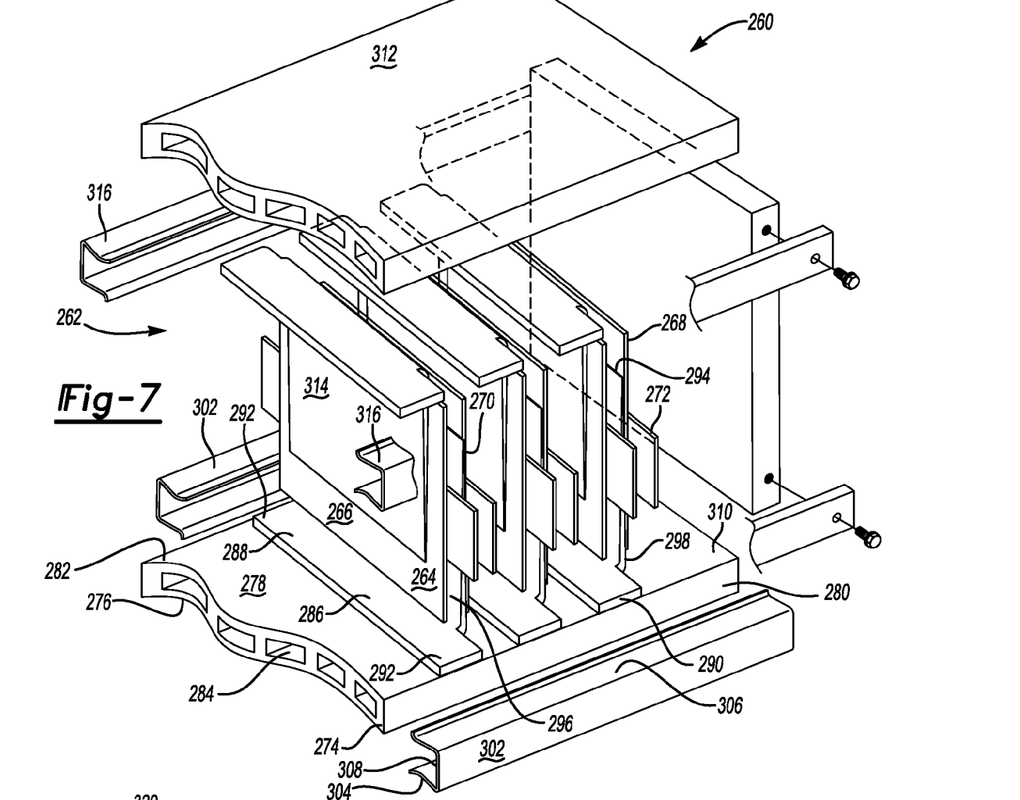
FIG. 7 illustrates a perspective view of a traction battery assembly having a clamped connection between the fins and thermal plates.

Referring to FIG. 7, a traction battery assembly 260 is shown. The traction battery assembly 260 is similar to assemblies 50, 130 and 200 but specifically illustrates a clamp connection between the fins and their corresponding thermal plate. The assembly 260 includes a battery array 262. The battery array 262 includes a plurality of stacked cells 264. The invention contemplates the use of any type of cells. Illustrated are pouch-type cells 264 having a pair of opposing major surfaces 266, 268 that are interconnected by minor surfaces 270. Each cell 264 includes terminals 272 extending outwardly from one or more of the minor surfaces 270.

The traction battery assembly 260 includes a first thermal plate 274. The first thermal plate 274 has an exterior side 276 and an interior side 278. The exterior side 276 and the interior side 278 are interconnected by sidewalls 280 forming a housing 282. Inside the housing 282 are internal conduits 284. The first thermal plate 274 includes a plurality of first fins 286. Each fin 286 is arranged such that the distal end 294 extends outwardly from the interior side 278 into the array 262. Each fin 286 includes a first contact surface 296 and a second contact surface 298 that is opposite the first contact surface 296. Each fin 286 has a base plate 288 defining the proximal end 290 of the fin 286. Each base plate 288 includes an opposing pair of projections 292 that extend outwardly from the fin 286 in a direction orthogonal to the minor surface of the first fin 286.

Each fin 286 is secured to the thermal plate 274 via a clamp 302. The clamp 302 may be any mechanism that is configured to apply a compressive force between the projections 292 and the thermal plate 274. The clamp may be a "C" shaped fin clip 302 that is arranged to clamp each fin 286 to the thermal plate 274. The clip 302 may be provided on one or both sides of the thermal plate 274. The clip 302 includes a first arm 304 and a second arm 306 that cooperate to define a channel 308. The projection 292 and the thermal plate longitudinal edge portion 310 are received within the channel 308. The first and second arms 304, 306 cooperate to clamp the base plate 288 against the thermal plate 274. Each fin 286 is interleaved between adjacent cells 264 with the contact surfaces 296, 298 being in contact with the major surfaces 266, 268 of the cells 264. The fins 286 may be tapered or uniform.

The battery assembly 260 also includes a second thermal plate 312. The first and second thermal plates 274, 312 are disposed on opposing sides of the array 262 and sandwich the array therebetween. The second thermal plate 312 is identical to the first thermal plate 274 and similarly includes a plurality of second fins 314. The second fins 314 are identical to the first fins 286 and are similarly attached to the second thermal plate 312 via a clamping mechanism 316.

Figure 8:
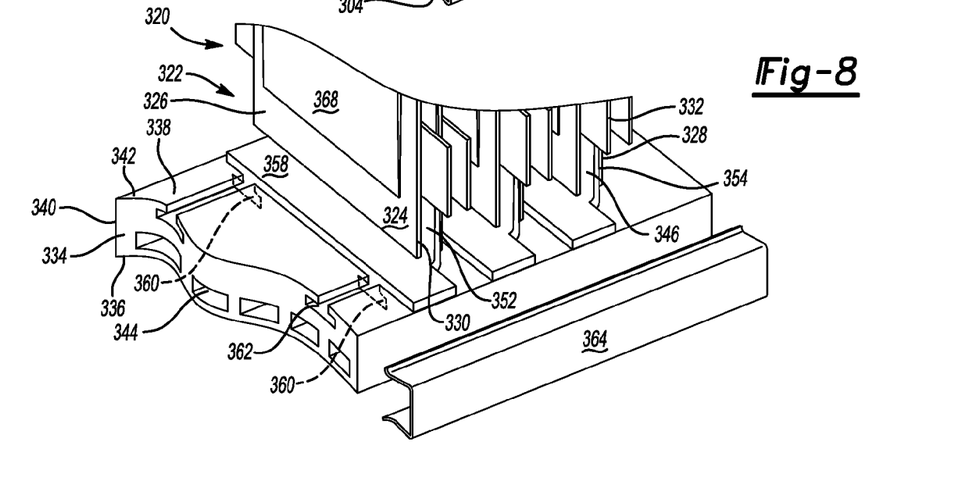
FIG. 8 illustrates a perspective view of a traction battery assembly with tongue and groove fin attachment.

Referring to FIG. 8, a battery assembly 320 is shown. The traction battery assembly 320 is similar to assemblies 50, 130, 200 and 260 but specifically illustrates a tongue and groove connection between the fins and their corresponding thermal plate. The assembly 320 includes a battery array 322. The battery array 322 includes a plurality of stacked cells 324. The invention contemplates the use of any type of cells. Illustrated are pouch-type cells 324 having a pair of opposing major surfaces 326, 328 that are interconnected by minor surfaces 330. Each cell 324 includes terminals 332 extending outwardly from one or more of the minor surfaces 330.

The traction battery assembly 320 includes a first thermal plate 334. The first thermal plate 334 has an exterior side 336 and an interior side 338. The exterior side 336 and the interior side 338 are interconnected by sidewalls 340 forming a housing 342. Inside the housing 342 are internal conduits 344. The first thermal plate 334 includes a plurality of first fins 346. Each fin 346 is arranged such that the distal end extends outwardly from the interior side 338 into the array 322. Each fin 346 includes a first contact surface 352 and a second contact surface 354 that is opposite the first contact surface 352. The contact surfaces 352, 354 are the surfaces that contact the cells 324.

Each fin 346 has a base plate 358 that includes at least one tongue 360. The at least one tongue 360 is received within a corresponding groove 362 that is disposed in the thermal plate 334. The tongue and groove arrangement transversely positions the fins to the array 322 and allows axial movement (i.e. movement in the length direction of the first thermal plat 334), which may be advantageous during assembly. The fins 346 may be axially secured using end plates, clips 364 or other bracketry. Each fin 346 is interleaved between adjacent cells 324 with the contact surfaces 352, 354 being in contact with the major surfaces 326, 328 of the cells 324. The fins 346 may be tapered or uniform.

The battery assembly 320 also includes a second thermal plate (not shown). The first and second thermal plates are disposed on opposing sides of the array 322 and sandwich the array therebetween. The second thermal plate is identical to the first thermal plate 334 and similarly includes a plurality of second fins 368 that are identical to the first fins 346.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A traction battery comprising:
cells stacked in an array; and
thermal plates spaced apart to define a gap that receives the array, and including a plurality of tapered fins each extending out from only one of the thermal plates into the array and partially spanning the gap, and interleaved with the cells, wherein the cells are rotated at an oblique angle relative to an interior side of the thermal plates to seat against the fins.

2. The traction battery of claim 1 wherein the fins are interleaved such that only one fin is interleaved between any two adjacent cells.

3. The traction battery of claim 1 wherein each of the fins further comprises a base portion and a tip portion.

4. The traction battery of claim 3 wherein the base portion is attached to one of the thermal plates and the tip portion is disposed within a perimeter of a major surface of a corresponding one of the cells.

5. The traction battery of claim 3 wherein the base portion has a larger cross-sectional area than the tip portion.

6. The traction battery of claim 3 wherein the base portion further comprises a living hinge that allows the fin to move relative to the thermal plates.

7. The traction battery of claim 1 further comprising at least one clamp configured to secure a base plate of each of the fins to a corresponding one of the thermal plates.

8. The traction battery of claim 1 wherein each of the fins further comprises a tongue cooperating with a groove in a corresponding one of the thermal plates to slidably secure the fin to the one of the thermal plates.

9. A traction battery assembly comprising:
a battery array including a plurality of stacked cells each having a pair of opposing major surfaces; and
a thermal plate disposed adjacent to a minor surface of each of the cells and including a plurality of fins extending therefrom and terminating at a free end, wherein each of the fins is disposed against the major surfaces of two adjacent cells and only extends across a portion of the major surfaces such that the free end is disposed within a perimeter of the major surface, and wherein each of the fins further includes opposing contact surfaces that are configured to seat against the major surfaces and are angled inwardly such that the opposing contact surfaces are closer together at the free end than at a fixed end.

10. The traction battery assembly of claim 9 wherein each of the fins further comprises opposing side surfaces that interconnect the opposing contact surfaces.

11. The traction battery assembly of claim 10 wherein each of the fins further comprises a living hinge proximate to the fixed end to allow the fin to move relative to the thermal plates.

12. The traction battery assembly of claim 9 wherein the thermal plate further includes an interior side and wherein cells are slanted relative to the inner side such that the major surfaces of each of the cells are at an oblique angle relative to the interior side.

13. The traction battery assembly of claim 9 wherein each of the fins further comprises a tongue, and each of the thermal plates further comprises a groove recessed into an interior side of the thermal plate and extending along an axial direction of the thermal plate, wherein the tongue of each of the fins is slidably received with the groove to slidably secure the fin to the thermal plate.

14. The traction battery assembly of claim 9 wherein each fin further comprises a base plate secured to an interior side of a corresponding thermal plate via at least one "C" shaped fin clip disposed around a longitudinal edge of the corresponding thermal plate and arranged such that a pair of arms clamp the base plate to the interior side of the corresponding thermal plate.

15. A traction battery comprising:
a battery array including a plurality of cells; and
a pair of thermal plates having planar surfaces sandwiching the array and including tapered fins each extending out from one of the planar surfaces into the array and interleaved with the cells, wherein each of the cells are rotated at an oblique angle relative to the planar surfaces to seat against the tapered fins to form a compact array.

16. The traction battery of claim 15 wherein each of the fins further includes a free end that is disposed within a perimeter of a major surface of a corresponding one of the cells.

17. The traction battery of claim 15 wherein each of the fins further comprises a living hinge that allows the fin to move relative to the thermal plates.

* * * * *